United States Patent [19]

Costa

[11] Patent Number: 4,934,532
[45] Date of Patent: Jun. 19, 1990

[54] CONTAINER FOR SLIDES

[75] Inventor: Gianluigi Costa, Valdagno, Italy

[73] Assignee: Tecnodia S.p.A., Valdagno, Italy

[21] Appl. No.: 241,333

[22] Filed: Sep. 6, 1988

Related U.S. Application Data

[63] Continuation of Ser. No. 928,323, Nov. 10, 1986, abandoned.

[30] Foreign Application Priority Data

Nov. 11, 1985 [IT]  Italy ................ 84152 A/85
Nov. 11, 1985 [IT]  Italy ................ 61951/85[U]

[51] Int. Cl.$^5$ ............................................. B65D 85/67
[52] U.S. Cl. ................................. 206/455; 206/456; 206/459; 229/72; 40/159; 40/405
[58] Field of Search ............... 206/390, 455, 459, 456; 40/159, 537, 404, 405; 229/69, 72; 383/37, 38

[56] References Cited

U.S. PATENT DOCUMENTS

| | | | |
|---|---|---|---|
| 1,707,756 | 4/1929 | Burroughs | 40/404 |
| 2,421,503 | 6/1947 | Hermon | 40/405 |
| 3,291,377 | 12/1966 | Eggen | 206/459 |
| 3,348,762 | 10/1967 | Kasinkas | 206/390 |
| 3,537,359 | 11/1970 | Finke | 493/11 |
| 3,679,127 | 7/1972 | Stefancin | 383/37 |
| 3,872,645 | 3/1975 | Dorman | 229/72 |
| 3,896,524 | 7/1975 | Parker | 206/390 |
| 3,941,246 | 3/1976 | Duden | 206/455 |
| 4,164,170 | 8/1979 | Nordin | 383/37 |
| 4,170,081 | 10/1979 | Kiejzik | 206/455 |
| 4,201,031 | 5/1980 | Wiles | 383/38 |
| 4,232,463 | 11/1980 | Spees | 40/405 |
| 4,238,541 | 12/1980 | Burton | 206/459 |
| 4,345,394 | 8/1982 | Sullivan | 40/405 |
| 4,433,783 | 2/1984 | Dickinson | 383/38 |
| 4,447,973 | 5/1984 | Wihlke | 40/405 |
| 4,502,596 | 3/1985 | Saetre et al. | 229/69 |
| 4,508,224 | 4/1985 | Weber et al. | 206/455 |
| 4,533,048 | 8/1985 | Ozeki | 206/455 |
| 4,602,714 | 7/1986 | Ozeki | 40/159 |
| 4,610,649 | 9/1986 | Friess | 493/11 |
| 4,629,070 | 12/1986 | Roberg | 206/455 |

FOREIGN PATENT DOCUMENTS 765473 1/1957 United Kingdom ................ 493/11

Primary Examiner—David T. Fidei
Attorney, Agent, or Firm—Charles Fallow; Martin Hoffman

[57] ABSTRACT

A container for mounted slides comprises a continuous strip of transparent material folded upon itself, with regularly spaced pairs of continuous welds extending across the width of the strip to define a series of transverse pockets closed at one end and open at the other. A number of mounted photographic slides can automatically inserted into the open end of each pocket.

4 Claims, 3 Drawing Sheets

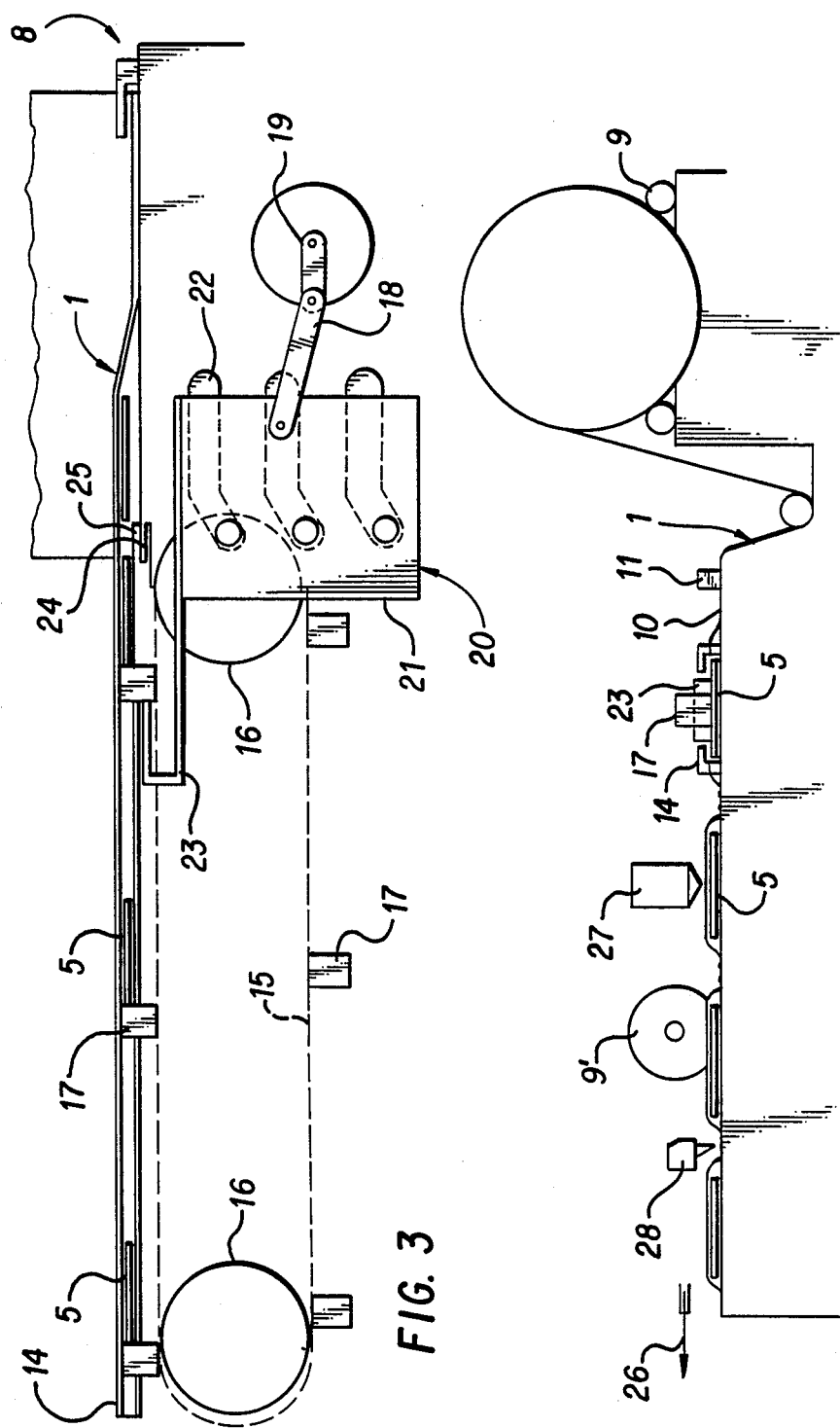

CONTAINER FOR SLIDES

This is a continuation of copending application Ser. No. 928,323 filed Nov. 10, 1986, now abandoned.

This invention relates to a container for slides and an apparatus for automatically packaging the slides in the container.

DESCRIPTION OF THE PRIOR ART

In photographic laboratories it is known to package the mounted slides originating from one and the same photographic film either in a rigid box or in a foldable display case coprising pockets.

When packaged in this manner, the slides are inserted into the socalled processing envelope, to be returned to the shop from which they came.

This box container has certain drawbacks, and in particular:

a size and weight which substantially affect transport and storage costs, the need to use one box for each photographic film, independently of the number of slides obtained from that film, a certain laboriousness in closing the box on termination of packaging, and a contribution in terms of cost per slide for this operation which is inversely proportional to the number of slides contained in the box, difficulty in inserting the box into the conventional processing envelope because of the size of said box, the inability of the user to view the slides without extracting them one by one from the box into which they have been inserted, the impossibility of filing the slides in ring-type holders.

The foldable display case with individual pockets substantially obviates the drawbacks of box containers, but has other drawbacks such as operational slowness deriving from the need to manually insert each slide into the corresponding pocket.

SUMMARY OF THE INVENTION

The object of the invention is to obviate the drawbacks jointly or separately present in known slide containers.

An other object of the invention is to allow automatic packaging of mounted slides, while overcoming the drawbacks of the known packaging methods using box-type containers or pocket-type containers.

These objects are attained according to the invention by a slide container characterised by consisting of a continuous strip of transparent material comprising a plurality of transverse pockets closed at one end and open at the other end, into which the predetermined number of slides can be inserted.

For automatically packaging the mounted slides in the container an apparatus is used, characterised by comprising:

a feeder for the continuos strip, means for successively positioning the various pockets of the continuous strip with their open end facing an insertion member for said slides, means for advancing said strip stepwise through a distance equal to the height of said pockets, after each of them has been filled with the predetermined number of slides, a cutter for transversely cutting the strip on termination of the packaging cycle.

BRIEF DESCRIPTION OF THE DRAWINGS

A preferred embodiment of the present invention is described in detail hereinafter by way of non-limiting example with reference to the accompanying drawings, in which:

FIG. 3 is a longitudinal section therethrough on the line III—III of FIG. 2,

FIG. 4 is a cross-section therethrough on the line IV—IV of FIG. 2, and

DESCRIPTION OF THE PREFERRED EMBODIMENT

Figure 1:
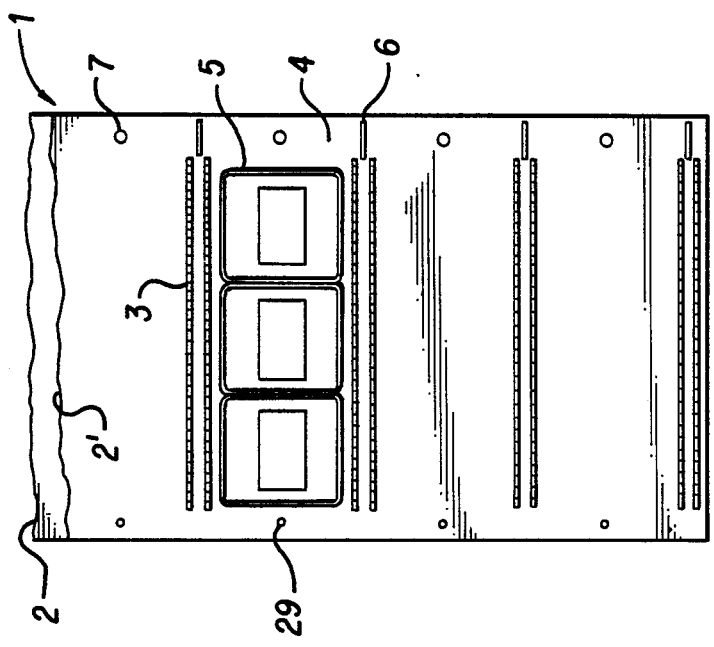
FIG. 1 is a plan view of a portion of a continuous strip according to the invention.

As can be seen from the figures, the container according to the invention is formed from a continuous strip 1 of transparent material, such as cellophane, polythene or other transparent film, folded longitudinally into two bands 2, 2' of the same width. In some cases it can be preferable for the two bands 2, 2' to be of different width, in that this can facilitate the opening-out of the aperture of each pocket 4 on inserting the slides 5 into it.

The strip 1 comprises a plurality of pairs of weld lines 3, the purpose of which is to define pockets 4 for housing mounted slides 5.

In order to allow easy separation of the side portions during insertion of the mounted slides 5, each pair of weld lines 3 stops before the free edge of the two folded side portions. In correspondence with the longitudinal crease in the strip 1, within the space delimited by the two weld lines of each pair, there are provided marks 6 which when suitable read by appropriate apparatus make correct automatic stepwise feed of the strip 1 possible for its synchronisation with the other packaging operations.

In correspondence with the longitudinal crease, the continuous strip 1 also comprises a plurality of holes 7 having a distance apart which is substantially equal to the standardised distance of the rings of ring-type holders.

The apparatus for automatically packaging the mounted slides in the container substantially comprises a bed 8 on which the various components are mounted. Specifically the bed 8 is provided with a roller assembly 9 for the continuous strip 1 and with a packaging table 10 along which the strip 1 advances, driven by pairs of rollers 9'. On the table 10 there is provided, in correspondence with the closed end of the pocket 4, an optical reader 11, for example of the photoelectric cell type, able to sense the presence of reference marks 6 printed on the strip 1.

A transfer line, indicated overall by 12, for the slides 5 originating from a conventional mounting apparatus 13, ie an apparatus which inserts the diapositives corresponding to the various photographs into rigid frames, for example of plastics construction, leads to the table 10 fo the bed 8.

The transfer line 12 comprises essentially a pair of guide rails 14, along which the slides 5 can slide under the thrust of an endless conveyor 15 stretched between two sprockets 16 and carrying a plurality of drive blocks 17 of width less than the width of the mounted slides 5 and spaced apart by a distance greater than this width.

One sprocket 16 is disposed in proximity to the packaging table 10, and in correspondence with this there is disposed a mechanism comprising a connecting rod 18 and crank 19, this latter being connected to an insertion member 20 mobile in both directions parallel to the transfer line 12. Specifically, the insertion member 19 comprises a slider 21 slidable in guides 22 which are substantially horizontal with the exception of that portion thereof closest to the transfer line 12, in correspondence with which this portion is inclined downwards. A forked insertion element 23 is rigid with the slider 21 and consists essentially of a pair of horizontal fingers pointing towards the packaging table 10 and spaced apart by a distance greater than the width of the drive blocks 17, but less than the width of the mounted slides 5. An element for parting the two bands 2,2' of the strip 1 is provided on said table 10 at the arrival position of the transfer line 12. Said parting element consists essentially of a slot 24 provided in a position slightly below the packaging table 10 to retain the lower side portion of the strip 1, and a pair of blocks 25 which form the front end of the guide rails 14 and raise the upper side portion of the strip.

Figure 2:
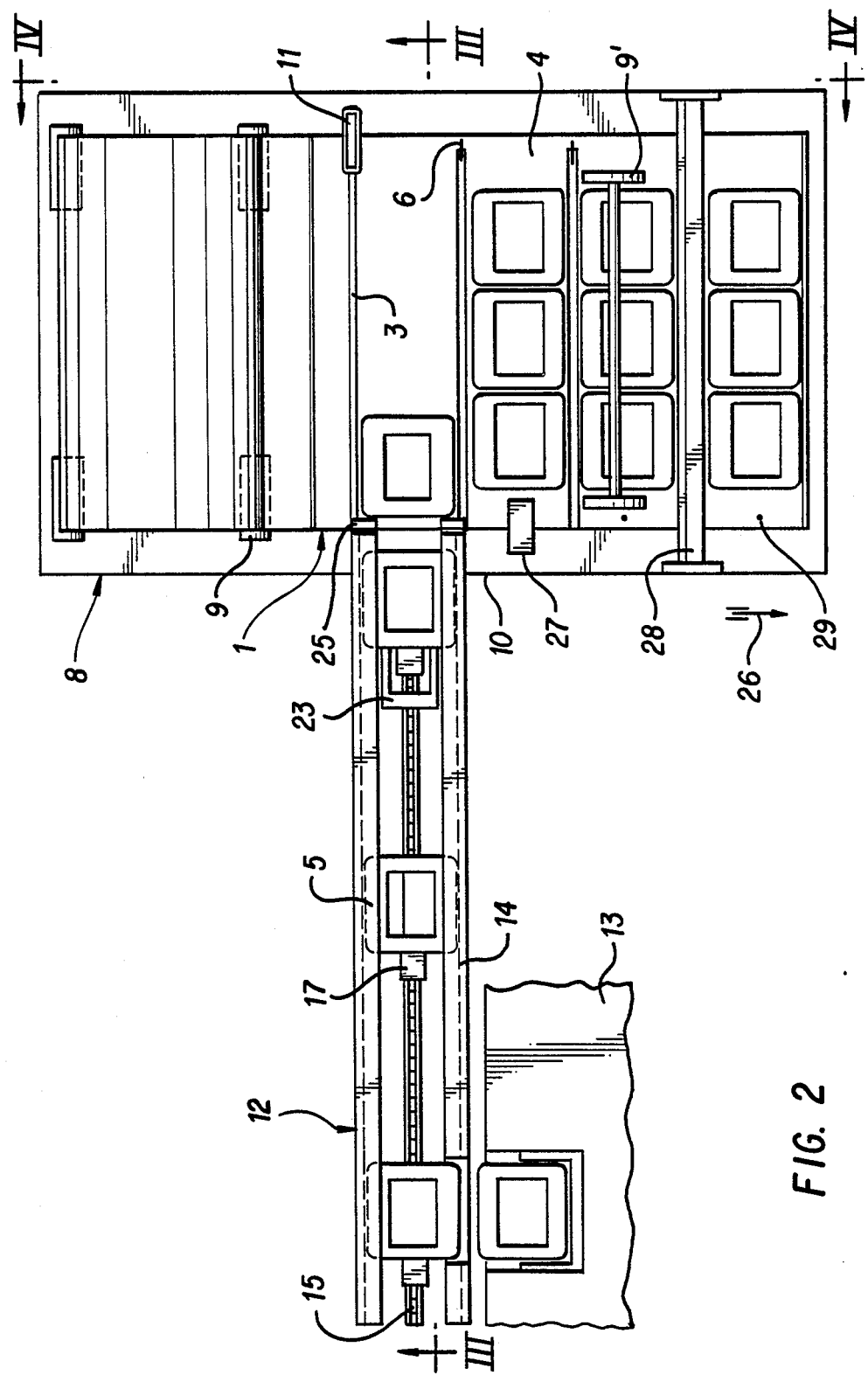
FIG. 2 is a diagrammatic plan view of an apparatus according to the invention for automatically packaging the mounted slides in the container.

Beyond the transfer line 12, with reference to the direction of advancement of the strip 1 indicated by the arrow 26 in FIGS. 2 and 4, there is also provided on the packaging table 10 a thermowelding device 27 arranged to act on the bands 2,2' of the strip 1. A transverse cutter 28 is provided downstream of said thermowelding device 27.

The apparatus according to the invention also comprises a plurality of operating members (motors, actuators, etc.) and transmission members (belts, pulleys, grear wheels, etc.), together with automatic control devices (switches, counters, various controls etc.) which enable the processing cycle to be effected automatically and which have been neither illustrated nor described for simplicity of representation. They will however be referred to in the course of the following description of operation by simple mention of their presence, as they are of conventional type and as such are known to the skilled man.

The operation of the apparatus according to the invention can best be clarified by reference to a normal operating state, and specifically that in which an empty pocket 4 faces the transfer line 12, the device comprising the connecting rod 18 and crank 19 is at rest with the slider 21 positioned at the end of the inclined portion of the guides 22 (to the left with reference to FIG. 3), the forked insertion element 23 is positioned below the level of the guides 14, and the enless conveyor 15 is at rest with all those drive blocks 17 lying within the portion between the mounting apparatus 13 and the packaging table 10 resting against a forwardly positioned mounted slide 5, and in particular with one of these latter facing the aperture of the forwardly positioned pocket 4, which has its side portions kept spaced apart by the slot 24 and the end blocks 25 of the guides 14. Finally, the cutter 28 is in its raised position.

When in this state, an automatic command causes the crank 19 to rotate through 360°. Following this rotation, the connecting rod 18 causes the slider 21 of the insertion member 20 to undergo outward travel along the guide 22 towards the packaging table 10, followed by return travel to its initial position. During the initial portion of the forward travel, ie while the slider 21 slides along the inclined portion of the guides 22, the forked insertion element 23 not only advance but rises as far as the level at which the slides 5 slide along the transfer line 12, and during the subsequent horizontal portion of its travel it inserts the slides 5 into the aperture of the pocket 4. During its return travel the forked element 23 after having travelled rearwards moves downwards to allow passage of the next slide 5 along the guides 14 above it.

It should be noted that because of the distance between the fingers of the forked insertion element 23, the drive block 17, although being at rest, does not hinder the movement of said forked insertion element 23.

The completion of this cycle causes a counter to advance through one unit, the purpose of this counter being to provide an output signal when the slides 5 inserted into one and the same pocket 4 reach the predetermined number.

After the insertion member 20 has returned to its initial position, the endless conveyor 15 is caused to advance through a distance equal to the distance between two successive drive blocks 17, so as to recreate the conditions for inserting the next slide 5 into the same pocket 4. The entry of this second slide causes the previously inserted slide to move forward through one position in the pocket 4, and the completion of this second cycle causes the aforesaid counter to advance through one unit.

When the predetermined number of slides have been inserted into the pocket 4, ie when the counter has reached the previously set number (the number "3" in the described example), it provides an output signal which temporarily deactivates the transfer line 12 and instead operates the member which drives the strip 1. This strip therefore advances through a distance equal to the welding pitch, so as to position the next pocket 4 in front of the transfer line 12. Correct positioning of this pocket, with consequent stoppage of the drive member for the strip 1, is determined by the optical reader 11 which "senses" the presence of the reference mark 6. This advancement of the strip 1 through one step moves the previously filled pocket 4 into a position in which the side portions at its aperture are exactly below the thermowelding device 27, which joins them together with a weld spot 29, thus completely closing the pocket 4.

In the meantime, operation of the transfer line recommences for filling the next pocket, and so on.

When there are not more slides pertaining to that batch, or to that "order" in current terminology, this state is indicated to the apparatus according to the invention. This can be done automatically, for example by means of an optical reader positioned on the transfer line 12 in proximity to the packaging table 10, to sense the absence of slides. Alternatively, it can be done automatically for example by means of a signal provided by the mounting machine which will have previously counted the slides pertaining to that order, or it can be done manually.

In all cases, when the operations involved in packaging the slides pertaining to one and the same order have been completed, and independently of wheter the last pocket has been filled completely or not, the strip 1 is advanced until the last pocket also comes under the action of the thermowelding device 27. The strip 1 is then again advanced until the last pocket has passed beyond the cutter 28, which is immediately operated to separate the already filled strip portion so that it can be fed to subsequent packaging operations.

In order to prevent wastage of material it is preferable for the transverse welds 3 forming the various pockets 4 to each consist of two parallel weld lines, between which the cutter 28 can act.

The apparatus according to the invention has for simplicity been described with the variuos parts being treated independently of each other and being operated one at a time, while the other parts remain at rest. It is however also possible by suitably synchronising the various parts to cause them to operate simultaneously, at least for some of them. Thus, in particular, it is possible for the transfer line 12 to move continuosly, synchronised with the continuos movement of the device comprising the connecting rod 18 and crank 19, so that both can be driven by the same motor.

From the aforegoing it is apparent that the container according to the invention has considerable advantages both compared with conventional box containers and compared with conventional foldable display cases with pockets.

In this respect, compared with the former:

it is of very small overall size, which is advantageous both for storage and for its facility for being contained in conventional processing envelope, it requires a portion of strip which is effectively proportional to the number of slides to be packaged, it protects slides from finger prints and dust, it allows direct viewing of the slides, without extracting them from the container, it allows immediate filing in ring-type holders.

Compared with the latter, it allows the slide insertion to be automated.

Figure 5:
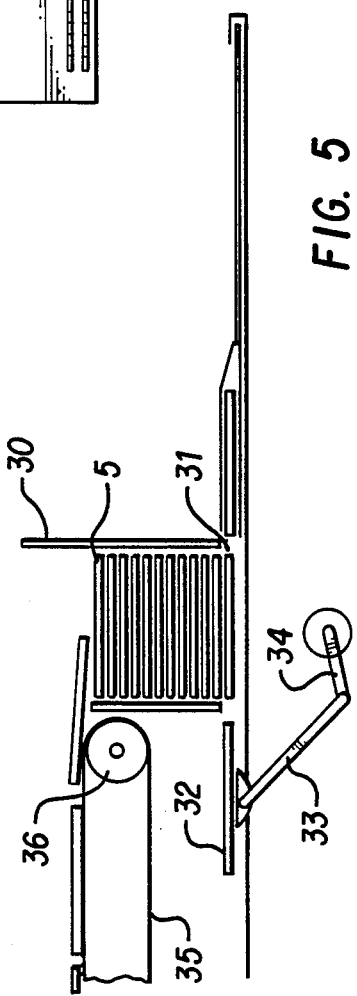
FIG. 5 is the same view as FIG. 3 of a second embodiment of the apparatus according to the invention.

In the embodiment shown in FIG. 5 the apparatus according to the invention comprises a store 30 for a pile of mounted slides 5. This store is placed facing the packaging rable 10 and is provided with a lower slot 31 from which the slides can be extracted one by one and inserted into the container by a slider 32, actuated with reciprocating motion by a connecting rod 33-crank 34 system.

The slides 5 can be manually inserted into the container as a set of slides belonging to a same order, or can be carried along a conveyor belt 35 guided on rollers 36.

I claim:

1. A mounted slide container, comprising
a continuous strip of transparent plastic material folded longitudinally to define two bands interconnected along a common folded edge,
said bands being joined together at regular intervals along the length of said strips by a series of equally spaced paris of closely adjacent transverse welds extending across said strip only from the longitudinal folded edge to a point a short distance from either longitudinal free opposite edge, so as to define a series of transverse pockets between said side portions, each pocket being closed at one end by said folded edge, and open at the opposite end thereof between said free edges, said edges being separable to allow the insertion of a plurality of mounted slides, in a direction orthogonal to the longitudinal axis of said strip, and
a plurality of reference marks having a spacing equal to the spacing between axes of successive transverse pockets, wherein each such reference mark is placed longitudinally between a corresponding pair of said welds.

2. A mounted slide container as claimed in claim 1, wherein each reference mark is offset laterally to one side of the welds, in the direction of said free edges, so as to be easily machine-readable.

3. A mounted slide container, comprising
a double-wall continuous strip of transparent plastic material comprising two bands joined along one edge and having a free opposite edge, said bands being joined together at regular intervals along the length of said strip by a series of equally spaced pairs of closely adjacent, continuous transverse welds extending across said strip substantially from the joined edge of the bands to a point a short distance from either longitudinal free opposite edge, so as to define a series of transverse pockets extending the whole width of the strip,
each pocket being closed at one end by said joined edge of the bands, and open only at the opposite end thereof between said free edges, said edges being separable to allow the insertion of a plurality of mounted slides displaceable from the opening end of the pocket to the opposite end thereof by pushing, whereby new mounted slides can be subsequently inserted into the same pocket,
wherein the double-wall continuous strip consists of a single-wall strip folded longitudinally to define the two bands interconnected along the common folded edge, and
further comprising a plurality of reference marks having a spacing equal to the spacing between axes of successive transverse pockets,
wherein each reference mark is placed longitudinally between a corresponding pair of said welds.

4. The invention of claim 3, wherein each reference mark is offset laterally to one side of the welds, in the direction of said free edges, so as to be easily machine-readable.

* * * * *

UNITED STATES PATENT AND TRADEMARK OFFICE
CERTIFICATE OF CORRECTION

PATENT NO. : 4,934,532

DATED : June 19, 1990

INVENTOR(S) : Costa

It is certified that error appears in the above-identified patent and that said Letters Patent is hereby corrected as shown below:

On the title page Item (63) column 1, line 5, "928,323" should read --928,383--.

Signed and Sealed this

Seventeenth Day of September, 1991

Attest:

HARRY F. MANBECK, JR.

Attesting Officer

Commissioner of Patents and Trademarks